United States Patent
Toet et al.

(10) Patent No.: US 9,925,498 B2
(45) Date of Patent: Mar. 27, 2018

(54) ANTITELESCOPING DEVICE AND CLAMP FOR SPIRAL WOUND MODULES COMPRISING A VENT

(71) Applicants: Fujifilm Manufacturing Europe B.V., Tilburg (NL); Fujifilm Corporation, Tokyo (JP)

(72) Inventors: Erwin Toet, Tilburg (NL); Nori Miyagishima, Tilburg (NL); Peter Jessen, Tilburg (NL); Marcel Koudijs, Tilburg (NL); Eduard Van Der Burg, Tilburg (NL); Yujiro Itami, Tilburg (NL)

(73) Assignees: Fujifilm Manufacturing Europe B.V. (NL); Fujifilm Corporation (JP)

( * ) Notice: Subject to any disclaimer, the term of this patent is extended or adjusted under 35 U.S.C. 154(b) by 89 days.

(21) Appl. No.: 15/026,978

(22) PCT Filed: Sep. 30, 2014

(86) PCT No.: PCT/GB2014/052946
§ 371 (c)(1),
(2) Date: Apr. 3, 2016

(87) PCT Pub. No.: WO2015/049503
PCT Pub. Date: Apr. 9, 2015

(65) Prior Publication Data
US 2016/0256830 A1    Sep. 8, 2016

(30) Foreign Application Priority Data
Oct. 3, 2013 (GB) .................................. 1317523.7

(51) Int. Cl.
*B01D 63/10* (2006.01)
*B01D 53/22* (2006.01)
*B01D 71/64* (2006.01)

(52) U.S. Cl.
CPC ......... *B01D 63/106* (2013.01); *B01D 53/228* (2013.01); *B01D 71/64* (2013.01);
(Continued)

(58) Field of Classification Search
CPC .... B01D 53/22; B01D 53/228; B01D 63/106; B01D 71/64; B01D 2313/02; B01D 2313/143; B01D 2313/146; B01D 2313/16
See application file for complete search history.

(56) References Cited

U.S. PATENT DOCUMENTS 3,899,309 A    8/1975 Hoehn et al.
4,517,085 A *  5/1985 Driscoll ................. B01D 63/12
                                                         210/232

(Continued)

FOREIGN PATENT DOCUMENTS

EP    0141201 A1    5/1985
EP    2025389 A1    2/2009
(Continued)

OTHER PUBLICATIONS

English language machine translation of JP 2012-66184. Retrieved from https://worldwide.espacenet.com on Aug. 25, 2017.*
(Continued)

*Primary Examiner* — Jason M Greene
(74) *Attorney, Agent, or Firm* — Banner & Witcoff, Ltd.

(57) ABSTRACT

A gas separation module comprising: (a) a permeate collection tube; (b) a membrane envelope wound spirally around the tube to provide a wound membrane structure comprising two end faces; and (c) an anti-telescoping device (ATD) secured to the permeate collection tube, the ATD comprising: (i) an inner peripheral part, (ii) an outer peripheral part which surrounds the inner peripheral part, (iii) one or more connection parts which connect the inner peripheral part and
(Continued)

the outer peripheral part and which contacts with one of said end faces; (iv) vents which allow gas to flow through the ATD; wherein the ATD satisfies Formula (1): (L CP−L contact)/(L VENT)=R Formula (1) wherein: R is from 1.47 to 1.88; L VENT is the cross sectional area of the vents which allow gas to flow through the ATD; L CP is the total area inside the outer peripheral part; and L contact is the contact area of the connection parts and the end face of the wound membrane envelope. Clamps are also claimed.

17 Claims, 3 Drawing Sheets

(52) U.S. Cl.
CPC .......... *B01D 53/22* (2013.01); *B01D 2313/02* (2013.01); *B01D 2313/143* (2013.01); *B01D 2313/146* (2013.01); *B01D 2313/16* (2013.01)

(56) References Cited

U.S. PATENT DOCUMENTS

| | | | |
|---|---|---|---|
| 4,717,394 A | 1/1988 | Hayes | |
| 4,802,982 A * | 2/1989 | Lien | B01D 63/10 210/247 |
| 4,906,372 A | 3/1990 | Hopkins | |
| 5,108,604 A | 4/1992 | Robbins | |
| 5,128,037 A | 7/1992 | Pearl et al. | |
| 5,733,663 A | 3/1998 | Scheunemann et al. | |
| 5,817,235 A | 10/1998 | Tortosa | |
| 5,851,267 A | 12/1998 | Schwartz | |
| 7,341,663 B2 | 3/2008 | Offeman et al. | |
| 2003/0024868 A1 | 2/2003 | Hallan et al. | |
| 2004/0226886 A1* | 11/2004 | Hester | B01D 63/08 210/649 |
| 2009/0095670 A1 | 4/2009 | Uda et al. | |
| 2013/0021658 A1 | 1/2013 | Miao et al. | |
| 2013/0026090 A1 | 1/2013 | Johnson et al. | |
| 2014/0353239 A1* | 12/2014 | Lesan | B01D 63/106 210/335 |

FOREIGN PATENT DOCUMENTS

| | | | | |
|---|---|---|---|---|
| JP | 2012-66184 | * | 4/2012 | ........... B01D 63/106 |
| WO | 2012/039302 A1 | | 3/2012 | |
| WO | 2013021658 A1 | | 2/2013 | |
| WO | 2013033616 A1 | | 3/2013 | |

OTHER PUBLICATIONS

International Preliminary Report on Patentability issued in corresponding International Application No. PCT/GB2014/052946, dated Apr. 5, 2016.

International Search Report and Written Opinion issued in corresponding International Application No. PCT/GB2014/052946, dated Dec. 16, 2014.

* cited by examiner

ANTITELESCOPING DEVICE AND CLAMP FOR SPIRAL WOUND MODULES COMPRISING A VENT

RELATED APPLICATION DATA

This application is a National Stage Application under 35 U.S.C. 371 of co-pending PCT application number PCT/GB2014/052946 designating the United States and filed Sep. 30, 2014; which claims the benefit of GB application number 1317523.7 and filed Oct. 3, 2013 each of which are hereby incorporated by reference in their entireties.

This invention relates to gas separation modules, to gas separation devices comprising two or more of the modules and to use of the modules and devices for separating gases.

Gas separation membranes and modules containing them have been in industrial use for many years. For convenience and space efficiency reasons, it is desirable to pack a large membrane area into a small volume. One technique for packing a large membrane area into a small volume is to wind a membrane envelope spirally around a perforated permeate collection tube to create a wound membrane structure and then place the structure in a housing which can withstand high pressures to give a module. The wound membrane structure is typically cylindrical and comprises two parallel end faces (one at each end) and a face of circular cross-section joining them. Feed spacers are often included in the membrane envelopes to space the membranes apart and give the feed gas free access to the membrane surface. Permeate spacers are typically provided between the membrane envelopes to guide gas which has permeated through the wound membrane envelope(s) to a permeate collection tube. The envelopes therefore typically comprise outer membrane sheets and an inner feed spacer, e.g. a screen which creates space between the membranes through which feed gas may flow freely. In use, feed gas is fed into the housing where it meets the spirally wound membrane envelope. A portion of the feed gas permeates through the membrane sheets to the permeate carrier, where it spirals towards the centre, passes through the perforations and into the permeate collection tube, which may protrude at one or both ends beyond the membrane envelope. The permeate gas then exits the module. The various components of the module are arranged such that in use, only permeate can enter the permeate collection tube. The feed gas and retentate gas cannot enter the permeate collection tube.

Modules typically contain multiple membrane envelopes, such as 20 or more, and typically have a usable membrane area of up to 40 or 50 $m^2$.

Modules are normally built in standard sizes. Ideally, the size of the module is such that weighs up to about 24 Kg and can be manhandled easily by one or two persons. The requirement for a specific membrane area is met by constructing a gas separation device comprising two or more of the modules, often in a permanent housing. If the membranes need to be replaced after extensive use, one or more of the complete modules may be removed from the housing and replaced with a new module. This procedure minimizes any plant downtime required for membrane replacement.

The feed gas stream typically enters a module through its inlet port at one end and exits through its outlet port at the opposite end. The linear speed of the feed gas is substantial and this can cause the problem of "telescoping" where the membrane envelope partially unwinds, increasing the width of the membrane in a similar manner to how a telescope is extended in use. The membrane may also unwind in radial direction. Such unwinding can seriously damage or destroy the gas separation membranes.

To reduce or avoid the problem of unwinding, anti-telescoping devices (ATD's) may be fitted against the end faces of the wound membrane structure.

ATD's typically consist of a moulded plastic device, generally shaped like a wagon wheel, with a circular, inner peripheral part, a circular outer peripheral part which surrounds the inner peripheral part and with five to eight radial connection parts which connect the inner and outer peripheral parts. The spaces between the 'spokes' are vents which allow feed gas to flow through the ATD and into the membrane envelope where it is separated into a permeate and a retentate.

The permeate collection tube is typically longer than the wound membrane structure in order to allow the tube to protrude and to permit the ATD to slide over the permeate tube and abut the end of the wound membrane structure.

In order to secure the ATD in place, typically a solid clamp is slid onto the permeate tube, after the ATD. This clamp holds the ATD firmly in contact with the end of the wound membrane structure and thereby prevents telescoping.

U.S. Pat. No. 5,817,235 describes an ATD for use in an ultrafiltration unit designed to filter liquids in pre-cheese production. The entire profile of the ATD contacts the end face of the wound membrane structure.

Gas separation modules are typically used to separate a feed gas mixture containing a target gas into a permeate stream and a retentate stream, one of which is depleted in the target gas and the other being enriched in the target gas. Historically the focus of research aimed at improving the selectivity of gas separation modules has concentrated on the chemical composition and properties of the membranes. However the present inventors have found that the ability of a gas separation module to discriminate between gases may also be affected by the geometry and mechanical components of the module, as described in more detail below.

According to the present invention there is provided a gas separation module comprising:
(a) a permeate collection tube;
(b) a membrane envelope wound spirally around the tube to provide a wound membrane structure comprising two end faces; and
(c) an anti-telescoping device (ATD) secured to the permeate collection tube, the ATD comprising:
  (i) an inner peripheral part,
  (ii) an outer peripheral part which surrounds the inner peripheral part,
  (iii) one or more connection parts which connect the inner peripheral part and the outer peripheral part and which contacts with one of said end faces;
  (iv) vents which allow gas to flow through the ATD;
wherein the ATD satisfies Formula (1):

$$(L_{CP} - L_{contact})/(L_{VENT}) = R \quad \text{Formula (1)}$$

wherein:
R is from 1.47 to 1.88;
$L_{VENT}$ is the cross-sectional area of the vents which allow gas to flow through the ATD;
$L_{CP}$ is the total area inside the outer peripheral part; and
$L_{contact}$ is the contact area of the connection parts and the end face of the wound membrane envelope.

The term "comprising" is to be interpreted as specifying the presence of the stated parts, steps or components, but does not exclude the presence of one or more additional parts, steps or components.

Reference to an element by the indefinite article "a" or "an" does not exclude the possibility that more than one of the element(s) is present, unless the context clearly requires that there be one and only one of the elements. The indefinite article "a" or "an" thus usually means "at least one".

The function of the permeate collection tube (or "tube" for short) is to collect the permeate gas which has passed through the membranes. The tube typically comprises perforations which allow permeate gas to flow from the exterior of tube to the interior.

Thus the membrane envelopes are preferably arranged such that the permeate can flow through perforations and into the tube and the retentate cannot flow through the perforations.

The tube is typically constructed of a rigid material, for example a metal (e.g. stainless steel) or a plastics material. One will usually select a material which is stable to the permeate gas.

The tube may have any cross sectional profile, e.g. triangular, square, pentagonal, hexagonal, elliptical or circular, with circular being preferred. Tubes having a circular cross sectional profile are useful for providing cylindrical wound membrane structures, e.g. comprising two parallel end faces and a third face which has a circular cross-section and joins with the two end faces.

The membrane envelope typically comprises outer membrane sheets and an inner feed spacer. The membrane sheets are usually rectangular and have two long edges and two short edges. Rectangular membrane sheets may be folded in two at the centre, and the feed spacer is located inside the fold, typically against the inside short edge.

The module preferably comprises more than one membrane envelope, e.g. 2 to 100, especially 20 to 50 membrane envelopes.

Typically the membrane sheets are composite membranes, e.g. comprising a discriminating layer and a porous support. The function of the discriminating layer is to preferentially discriminate between gases, separating a feed gas mixture into a permeate which passes through the membrane and a retentate which does not pass through the membrane. The permeate and retentate typically comprise the same gases as the feed gas mixture, but one is enriched in at least one of the gases present in the feed gas and the other is depleted in that same gas.

The porous support is typically open pored, relative to the discriminating layer. The porous support may be, for example, a microporous organic or inorganic membrane, or a woven or non-woven fabric. The porous support may be constructed from any suitable material. Examples of such materials include polysulfones, polyethersulfones, polyimides, polyetherimides, polyamides, polyamideimides, polyacrylonitrile, polycarbonates, polyesters, polyacrylates, cellulose acetate, polyethylene, polypropylene, polyvinylidenefluoride, polytetrafluoroethylene, poly(4-methyl 1-pentene) and especially polyacrylonitrile.

One may use, for example, a commercially available, porous sheet material as the support. Alternatively one may prepare the porous support using techniques generally known in the art for the preparation of microporous materials. In one embodiment one may prepare a porous, non-discriminatory support by curing curable components, then applying further curable components to the formed porous support and curing such components thereby forming the layer of cured polymer and the discriminating layer on the already cured porous support. One may also use a porous support which has been subjected to a corona discharge treatment, glow discharge treatment, flame treatment, ultraviolet light irradiation treatment or the like, e.g. for the purpose of improving its wettability and/or adhesiveness.

The porous support preferably has an average pore size of at least about 50% greater than the average pore size of the discriminating layer, more preferably at least about 100% greater, especially at least about 200% greater, particularly at least about 1000% greater than the average pore size of the discriminating layer.

The pores passing through the porous support typically have an average diameter of 0.001 to 10 μm, preferably 0.01 to 1 μm (i.e. before the porous support has been converted into a composite membrane). The pores at the surface of the porous support will typically have a diameter of 0.001 to 0.1 μm, preferably 0.005 to 0.05 μm. The pore diameter may be determined by, for example, viewing the surface of the porous support by scanning electron microscopy ("SEM") or by cutting through the support and measuring the diameter of the pores within the porous support, again by SEM.

The porosity at the surface of the porous support may also be expressed as a % porosity, i.e.

$$\% \text{ porosity} = 100\% \times \frac{(\text{area of the surface which is missing due to pores})}{(\text{total surface area})}$$

The areas required for the above calculation may be determined by inspecting the surface of the porous support using a SEM. Thus, in a preferred embodiment, the porous support has a % porosity >1%, more preferably >3%, especially >10%, more especially >20%.

The porosity of the porous support may also be expressed as a CO2 gas permeance (units are m3(STP)/m2·s·kPa). When the composite membrane is intended for use in gas separation the porous support preferably has a CO2 gas permeance of 5 to 150×10−5 m3(STP)/m2·s·kPa, more preferably of 5 to 100, most preferably of 7 to 70×10−5 m3(STP)/m2·s·kPa.

Alternatively the porosity is characterised by measuring the $N_2$ gas flow rate through the porous support. Gas flow rate can be determined by any suitable technique, for example using a Porolux™ 1000 device, available from Porometer.com. Typically the Porolux™ 1000 is set at the maximum pressure (about 34 bar) and one measures the flow rate (L/min) of $N_2$ gas through the porous support under test. The $N_2$ flow rate through the porous support at a pressure of about 34 bar for an effective sample area of 2.69 cm$^2$ (effective diameter of 18.5 mm) is preferably >1 L/min, more preferably >5 L/min, especially >10 L/min, more especially >25 L/min. The higher of these flow rates are preferred because this reduces the likelihood of the gas flux of the resultant composite membrane being reduced by the porous support.

The abovementioned % porosity and permeance refer to the porous support used to make the composite membrane (i.e. before step a) has been performed).

The porous support preferably has an average thickness of 20 to 500 μm, preferably 50 to 400 μm, especially 100 to 300 μm.

One may use an ultrafiltration membrane as the porous support, e.g. a polysulfone ultrafiltration membrane, cellulosic ultrafiltration membrane, polytetrafluoroethylene ultrafiltration membrane, polyvinylidenefluoride ultrafiltration membrane and especially polyacrylonitrile ultrafiltration membrane. Asymmetric ultrafiltration membranes may be used, including those comprising a porous polymer membrane (preferably of thickness 10 to 150 μm, more preferably 20 to 100 μm) and optionally a woven or non-woven fabric support. The porous support is preferably as thin as possible, provided it retains the desired structural strength.

Typically the discriminating layer is present on one side of the porous support or is partially or wholly within the porous support.

Preferred discriminating layers comprise a polyimide, especially a polyimide having —$CF_3$ groups and optionally carboxylic acid groups. Polyimides comprising —$CF_3$ groups may be prepared by, for example, the general methods described in U.S. Pat. Reissue No. 30,351 (based on U.S. Pat. No. 3,899,309) U.S. Pat. No. 4,717,394 and U.S. Pat. No. 5,085,676. Typically one or more aromatic dianhydrides, preferably having —$CF_3$ groups, are condensed with one or more diamines. The diamine(s) and dianhydride(s) copolymerise to form an AB-type copolymer having alternating groups derived from the diamine(s) and dianhydride(s) respectively.

Preferably the discriminating layer comprises groups of the Formula (2) wherein Ar is an aromatic group and R is a carboxylic acid group, a sulphonic acid group, a hydroxyl group, a thiol group, an epoxy group or an oxetane group:

Formula (2)

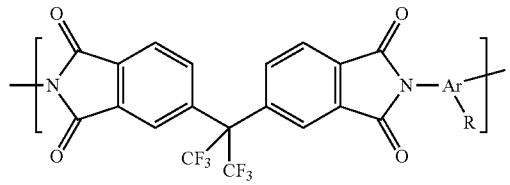

Optionally there may be a polymeric layer between the porous support and the discriminating layer, often referred to as a gutter layer. Preferred gutter layers comprise a dialkylsiloxane.

The feed spacer is preferably a screen, e.g. having a large mesh size to allow the feed gas to travel axially along membrane module. In most instances, the feed spacer will be utilized, but it is possible to construct a module without this component. In general, a feed spacer is formed of any inert material which maintains a space between the membranes.

Preferred materials for the feed spacer are open, channel forming grid materials, such as polymeric grid, or corrugated or mesh materials. Preferred among these are polypropylene or other polyolefin netting materials.

Typically the edges of adjacent membrane sheets which lie along the axial length of permeate collection tube are sealed together to provide the membrane envelopes so that gas flowing through the feed spacer screen is prevented from entering the permeate collection tube directly, and can only enter the tube to the extent that it's components can permeates through the membrane walls. Alternatively, the membrane sheet may be folded with the fold being adjacent to the tube and with feed spacer located within the fold such that membrane surfaces facing one another.

In one embodiment, the membrane envelope comprises a folded membrane sheet and at least one feed spacer, wherein the membrane sheet is folded around the at least one feed spacer.

Optionally the wound membrane structure further comprises one or more permeate spacers. In a preferred embodiment, the wound membrane structure further comprises a permeate envelope comprising at least two permeate spacers and a gas-impermeable sheet, wherein the gas-impermeable sheet is located between the at least two permeate spacers. In this latter embodiment comprising a gas-impermeable sheet, gas may pass from the feed spacer, through the membrane sheets and into the permeate spacers to create two permeate gas streams in each permeate envelope, separated by the gas-impermeable sheet. Subsequently these permeate streams may be mixed in the permeate collection tube.

Preferably alternate membrane envelopes and permeate envelopes are spiral wound around the permeate collection tube with the permeate carrier(s) in gas communication with the permeate collection tube.

After the membrane module has been wound, the resultant wound membrane structure may be held in a wound state through the use of restraining bands or outer wraps, or a combination thereof, in addition to the ATD. A preferred method of restraining the wound membrane structure (in addition to using an ATD) is by filament winding, in which a glass fibre filament dipped in an epoxy resin is wound around the wound membrane structure and cured. The wound membrane structure can then be loaded into a housing or pressure vessel which may be operated at a slight pressure drop across the module as the gas being filtered flows through. In operation, the feed gas is typically introduced at one end of the module and contacts one end face of the wound membrane structure, with the ATD unavoidably obstructing the feed gas flow to some extent.

The feed gas travels axially along membrane module and into the feed spacer. As the feed gas encounters the surface of the wound membrane structure, part of the feed gas (the permeate) passes through the membrane and into the permeate envelope. After the permeate passes through the membrane, it travels along the permeate carrier, eventually passing into permeate collection tube through the perforations. The permeate exits the membrane module through the permeate tube and the retentate travels axially through the module along the feed spacer.

An adhesive may be applied as glue lines to at least a part of the external periphery of the membrane sheets in order to seal three sides of each membrane envelope to the next membrane envelope, e.g. to three of the side edges and axial edges.

One may determine the value of $L_{CP}$ simply by measuring the total area total area inside the outer peripheral part in a plane perpendicular to the longitudinal direction of the permeate collection tube. When the outer peripheral part is not symmetrical in the direction parallel to the permeate collection tube (e.g. the inner circumference of the outer peripheral part is not the same on both sides of the ATD), one measures the total area inside the outer peripheral part on the side of the ATD which contacts with the wound membrane structure. This area includes the area of the vents which allow gas to flow through the ATD, the area of the inner peripheral part, the cross-sectional area of the connection parts and the area occupied by the permeate collection tube, including the inner space of the permeate collection tube through which permeate flows. $L_{CP}$ is discussed further below in relation to FIG. 2(b).

In commercially available modules having spoke-like connection parts which are of uniform cross sectional area along their entire radial length, the value of $(L_{CP}-L_{contact})$ is identical to the value of $(L_{VENT})$ The value of R in such modules is therefore 1.0. In the modules of the present invention, the value of $(L_{CP}-L_{contact})$ is greater than the value of $L_{VENT}$ such that the value of R required by Formula (1) is achieved.

The aforementioned value of R may therefore be obtained simply by adjusting the values of $L_{CP}$, $L_{contact}$ and $L_{VENT}$.

R is preferably from 1.50 to 1.83, more preferably from 1.50 to 1.65, especially from 1.50 to 1.60.

The module preferably further comprises a clamp for securing the ATD in contact with end face of the wound membrane structure, especially a clamp which comprises vents through which gas may flow. The clamp optionally comprises at least two parts, which parts are secured together around the permeate collection, for example using bolts.

The ATD may comprise several parts, although preferably the ATD is one part, i.e. a single integral unit.

The outer peripheral part preferably has an internal circumference which is from 0 to 5% larger than the external circumference of the wound membrane structure. In this way, the end face of the wound membrane structure may be placed within the rim of the outer peripheral part and the rim can prevent the wound membrane from unwinding in the radial direction. The outer peripheral part preferably fits snugly over a part of the wound membrane structure.

The cross sectional area of the vents which allow gas to flow through the ATD ($L_{VENT}$) may be determined by viewing the ATD in a plane perpendicular to the axis of the permeate collection tube and measuring the area which allows gas to flow through the ATD. This is illustrated in FIG. 2(a) as discussed below. The area of the ATD vents does not include the area within the permeate collection tube.

The ATD preferably has a profile of a spoked-wheel, when viewed in a plane perpendicular to the permeate collection tube. In this case, the open spaces between the spokes are the vents and $L_{VENT}$ is the total cross sectional area of the open spaces between the spokes, when viewed in a plane perpendicular to the permeate collection tube. Other ATD cross-sectional profiles are also possible, as illustrated in FIG. 3.

Preferably the module according to the invention comprises two of said anti-telescoping devices (ATDs), one at each end of the wound membrane structure and in contact with the respective end faces, thereby preventing the membrane envelope(s) from unwinding from the tube.

In modules comprising two ATDs, the module preferably comprises two or more clamps for securing the ATDs in contact with the respective end faces of the wound membrane structure. Preferably both of these clamps comprise vents through which gas may flow.

The ATD vents are preferably sufficiently large and numerous to ensure that the ATD does not excessively impede the flow of feed gas, and yet not so large and numerous that they substantially weaken the ATD. Thus in a preferred embodiment, the value of $L_{VENT}$ is 40 to 90%, more preferably 45 to 75%, especially 58.5 to 65% of the value of $L_{CP}$.

Similar principles apply to the clamp. The clamp preferably comprises vents which are sufficiently large and numerous to ensure that the clamp does not excessively impede the flow of feed gas and yet not so large and numerous that they substantially weaken the clamp. Thus the present invention further provides a clamp suitable for securing an anti-telescoping device in contact with an end face of a wound membrane structure, the clamp comprising vents which allow gas to flow through the clamp when the clamp is fixed to a permeate collection tube, wherein the area of the vents is 1 to 90% (preferably 3 to 50%, especially 10 to 25%) of the total cross sectional area of the clamp, e.g. when measured in a plane perpendicular to the axis of the permeate collection tube. For the purposes of this calculation, the total cross sectional area of the clamp includes the cross sectional area of the clamp vents.

The area of the clamp vents which allow gas to flow through the clamp may be determined by viewing the clamp in a plane perpendicular to the axis of the permeate collection tube and measuring the area of the clamp's profile (analogous to how $L_{VENT}$ is measured on the ATD). The area of the clamp vents does not include the area within the permeate collection tube.

Preferably at least 10%, more preferably at least 30%, especially at least 60%, more especially at least 75%, particularly at least 90% or even 100% of the area of the clamp vents overlaps with the area of the ATD vents. In this way, the extent to which the clamp reduces flow of gas through the ATD is reduced.

Preferably the area of overlap between the non-vent area of the clamp an the ATD vents is less than 40%, more preferably less than 30%, especially less than 20%, more especially less than 10% of the total area of the ATD vents. In this way, the extent to which the non-vent areas of the clamp reduces flow of gas through the ATD is reduced.

The connection parts may have any desired cross sectional shape. However it is preferred for the cross sectional shape of at least one, and preferably all, of the connection parts to be narrower at the end nearest the wound membrane structure than the end furthest away from the wound membrane structure. Thus at least one of the one or more connection parts preferably has a face nearest to the wound membrane structure and a face furthest away from the wound membrane structure, wherein the face nearest to the wound membrane structure is narrower than the face furthest away from the wound membrane structure. Such a cross-sectional shape may be achieved by, for example, using a connection part having a trapezoidal cross section (especially an isosceles trapezoidal cross section) wherein the narrowest end of the trapezoid is nearer to the wound membrane structure than the widest end of the trapezoid. In a preferred embodiment, one or more of the connection parts has an isosceles trapezoidal cross section having a base angle (sometimes referred to as "flap angle") of 70 to 89°, preferably 85 to 88°. A connection part having an isosceles trapezoidal cross section is illustrated in FIG. 4 below and the base angle is marked as "flap angle".

BRIEF DESCRIPTION OF THE DRAWINGS

FIG. 1 is an exploded, perspective view of part of a gas separation module comprising a perforated permeate collection tube (13) (perforations not shown), an optional clamp comprising two parts (3A) and (3B) secured together with bolts (2A) and (2B) (bolt (2B) is hidden behind the permeate collection tube (13)). The clamp (3) comprises six circular vents which allow gas to flow through the clamp. The ATD has connection parts (two of the connection parts indicated by numeral (9)), six vents (two of the vents indicated by numeral (4)) and the overall profile of a spoked-wheel. The module comprises a wound membrane structure comprising end face (12). In use, projections (not shown) on the connection parts (9) which extend in the axial direction are pressed firmly in contact with the end face (12) of the wound membrane structure. The circumference of the outer peripheral part has a rim, which is longer than the projections, fitting snugly over a part of the wound membrane structure to prevent the envelope from unwinding from the tube in radial direction.

FIG. 1(a) shows the side of the ATD which does not contact with the end face of the wound membrane and FIG. 1(b) shows the side of the ATD which does contact with the end face of the wound membrane. FIG. 1(a) and FIG. 1(b) also show the inner peripheral part (15), the outer peripheral part (14) and the connection parts (9) which connect the inner and outer peripheral parts. Inner peripheral part (15) can slide onto a permeate collection tube.

Figure 1:
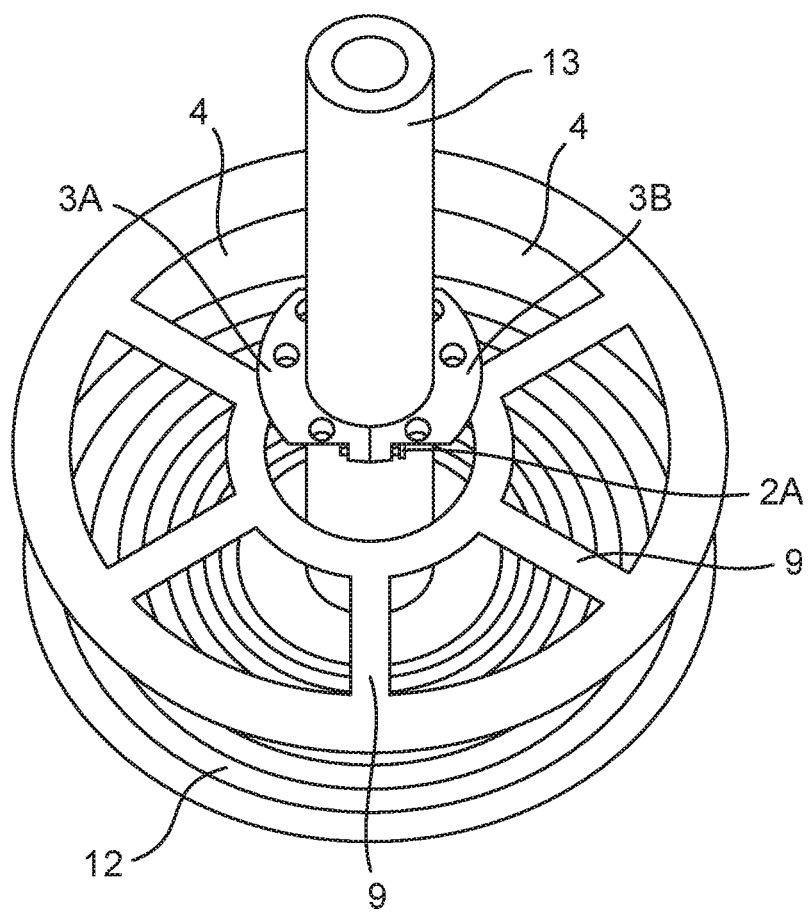
FIG. 1 is an exploded, perspective view of part of a gas separation module.
Figure 1A:
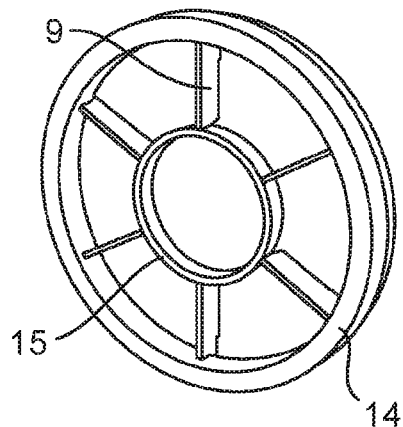
FIGS. 1(a) and 1(b) are perspective views of the two opposite sides of an ATD.
Figure 2A:
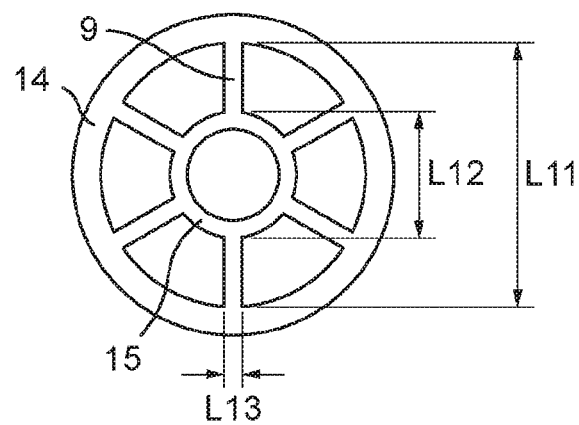
FIG. 2(a) shows the vents which allow gas to flow through the ATD as the 'white spaces' between the inner (15) and outer (14) peripheral parts and connection parts (9)

The vents which allow gas to flow through the ATD are shown in FIG. 2(a) as the 'white space' between the inner peripheral part (15), the outer peripheral part (14) and the connection parts (9). Thus in the ATD of FIGS. 1(a), 1(b), 2(a) and 2(b), $L_{VENT}$ can be calculated approximately as follows, wherein $L_{11}$, $L_{12}$ and $L_{13}$ are as shown in FIG. 2(a):

$$L_{VENT} = \pi(L_{11}/2)^2 - \pi(L_{12}/2)^2 - (6 \times L_{13} \times ((L_{11}-L_{12})/2))$$

Figure 2B:
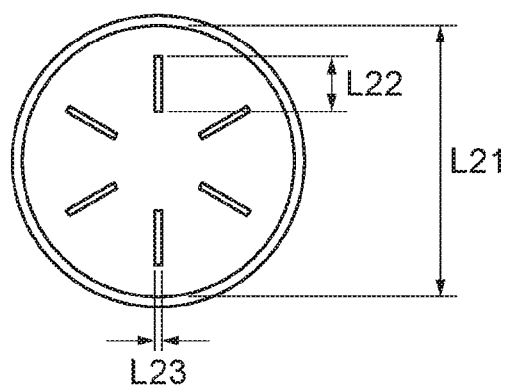
FIG. 2(b) shows the contact area of the connection parts and the end face of the wound membrane structure ($L_{contact}$) as the six black bars (L23×L22×6) inside the circle.

The contact area of the connection parts and the end face of the wound membrane structure ($L_{contact}$) is shown in FIG. 2(b) as the six bars inside the circle. $L_{contact}$ can be calculated as follows, wherein $L_{22}$ and $L_{23}$ are as shown in FIG. 2(b):

$$L_{contact} = 6 \times L_{22} \times L_{23}$$

Thus in the ATD shown in FIGS. 1(a), 1(b), 2(a) and 2(b), $L_{CP}$ is total area inside the outer peripheral part shown in FIG. 2(b) (not FIG. 2(a)). Thus the value of $L_{CP}$ for the ATD shown in FIGS. 1(a), 1(b), 2(a) and 2(b) can be calculated as follows, wherein $L_{21}$ is as shown in FIG. 2(b):

$$L_{CP} = \pi(L_{21}/2)^2$$

Figure 3:
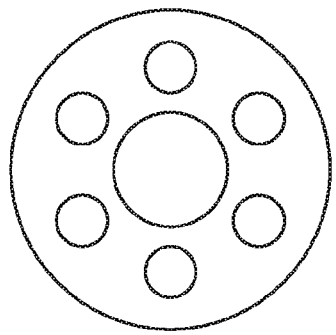
FIG. 3 shows an alternative ATD profile.

FIG. 3 shows an alternative ATD having six circular vents. In this case, $L_{CP} = \pi(L_{FIG3}/2)^2$ wherein $L_{FIG3}$ is the diameter of the outer circle shown in FIG. 3.

Figure 4:
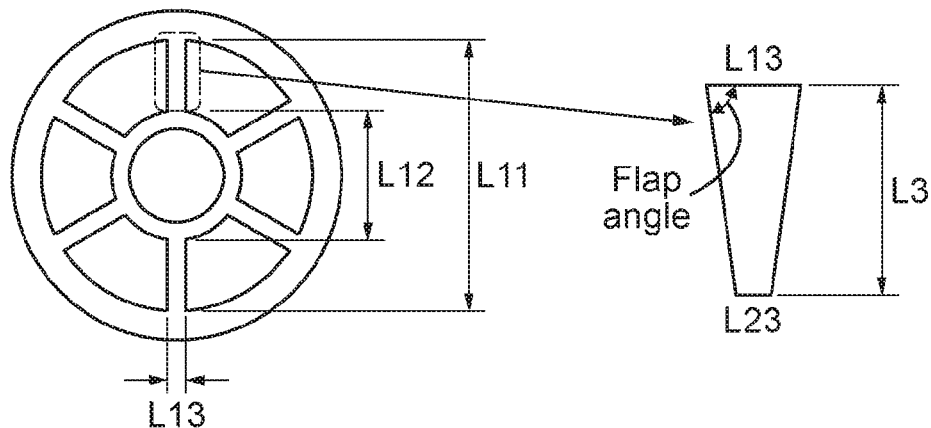
FIG. 4 shows an ATD and the isosceles trapezoidal cross section of one of its connection parts.

FIG. 4 is an end view of an ATD with a cross-sectional view through one of the connection parts. The connection part has an isosceles trapezoidal cross section. The base angle $\theta$ (sometimes referred to as "flap angle") is shown. The base angle (or flap angle) may be calculated as follows, wherein $L_3$, $L_{13}$ and $L_{23}$ are as shown in FIG. 4:

$$\theta = \text{Arctan}[2 \times L_3/(L_{13}-L_{23})]$$

Figure 5:
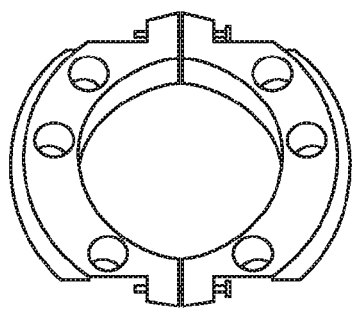
FIG. 5 is a perspective view of a clamp comprising vents.

The clamp in FIG. 5 comprises two semi-circular halves which may be bolted together to secure the clamp firmly on the permeate collection tube. The clamp has six identical, circular vents which allow gas to flow through the clamp. The area of the clamp vents which allow gas to flow through the clamp (i.e. the "Clamp Porosity") may be calculated as follows:

$$\text{Clamp Porosity} = [CA-(6 \times \pi_r^2)]/CA \times 100\%$$

wherein CA is the cross-sectional area of the clamp and r is the radius of the vents shown in FIG. 5.

Figure 6:
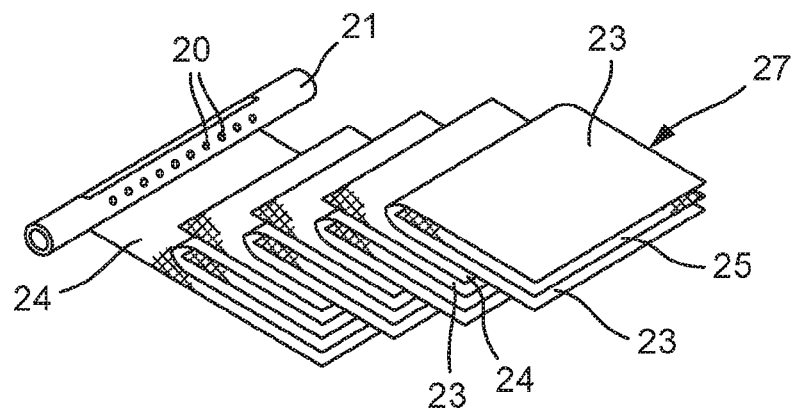
FIG. 6 is an exploded view of how membrane envelopes and spacer screens may be aligned for winding onto a permeate collection tube.

FIG. 6 illustrates how a membrane structure may be prepared. A permeate carrier (24) is attached to permeate collection tube (21) having perforations (20). A stack of alternate membrane envelopes (27) and permeate carriers (24) are aligned on the permeate collection tube (21). The membrane envelopes (27) comprise a rectangular membrane sheet (23) folded around a feed spacer (25) and the folded edge of the membrane envelope abuts the permeate collection tube (21). The stack is then wound around the permeate collection tube (21) to provide a membrane structure comprising two parallel end faces and a third face of circular cross-section. In a preferred embodiment (not shown), in place of each permeate carriers (24) there is used a permeate envelope comprising two permeate spacers and a gas-impermeable sheet, wherein the gas-impermeable sheet is located between the at least two permeate spacers. Feed gas is prevented from entering the permeate carriers (24) without first passing through the membranes (23) by depositing adhesive along the edge of the permeate carrier to form a gas-tight seal.

The modules according to the invention are particularly useful for separation of a feed gas containing a target gas into a gas stream rich in the target gas and a gas stream depleted in the target gas. For example, a feed gas comprising polar and non-polar gases may be separated into a gas stream rich in polar gases and a gas stream depleted in polar gases. In many cases the membranes have a high permeability to polar gases, e.g. $CO_2$, $H_2S$, $NH_3$, $SO_x$, and nitrogen oxides, especially $NO_R$, relative to non-polar gases, e.g. alkanes, $H_2$, $N_2$, and water vapour.

The target gas may be, for example, a gas which has value to the user of the membrane and which the user wishes to collect. Alternatively the target gas may be an undesirable gas, e.g. a pollutant or 'greenhouse gas', which the user wishes to separate from a gas stream in order to meet product specification or to protect the environment. The modules according to the invention are particularly useful for purifying natural gas (a mixture which predominantly comprises methane) by removing polar gases ($CO_2$, $H_2S$); for purifying synthesis gas; and for removing $CO_2$ from hydrogen and from flue gases. Flue gases typically arise from fireplaces, ovens, furnaces, boilers, combustion engines and power plants. The composition of flue gases depend on what is being burned, but usually they contain mostly nitrogen (typically more than two-thirds) derived from air, carbon dioxide ($CO_2$) derived from combustion and water vapour as well as oxygen. Flue gases also contain a small percentage of pollutants such as particulate matter, carbon monoxide, nitrogen oxides and sulphur oxides. Recently the separation and capture of $CO_2$ has attracted attention in relation to environmental issues (global warming).

The modules according to the invention are particularly useful for separating the following: a feed gas comprising $O_2$ and $N_2$ into a gas stream richer in $O_2$ than the feed gas and a gas stream poorer in $O_2$ than the feed gas; a feed gas comprising $CO_2$ and $N_2$ into a gas stream richer in $CO_2$ than the feed gas and a gas stream poorer in $CO_2$ than the feed gas; a feed gas comprising $CO_2$ and $CH_4$ into a gas stream richer in $CO_2$ than the feed gas and a gas stream poorer in $CO_2$ than the feed gas; a feed gas comprising $CO_2$ and $H_2$ into a gas stream richer in $CO_2$ than the feed gas and a gas stream poorer in $CO_2$ than the feed gas, a feed gas comprising $H_2S$ and $CH_4$ into a gas stream richer in $H_2S$ than the feed gas and a gas stream poorer in $H_2S$ than the feed gas; and a feed gas comprising $H_2S$ and $H_2$ into a gas stream richer in $H_2S$ than the feed gas and a gas stream poorer in $H_2S$ than the feed gas.

The invention is further illustrated by the following Examples. Gas Flux and Selectivity were measured as follows:

Gas Flux

Flux of each gas was calculated based on the following equation:

$$Q_i = (\theta_{Perm} \cdot X_{Perm,i})/(A \cdot (P_{Feed} \cdot X_{Feed,i} - P_{Perm} \cdot X_{Perm,i}))$$

wherein:
$Q_i$=Flux of each gas (m³(STP)/m²·kPa·s)
$\theta_{Perm}$=Permeate flow (m³(STP)/s)
$X_{Perm,i}$=Volume fraction of each gas in the permeate
A=Membrane area (m²)
$P_{Feed}$=Feed gas pressure (kPa)
$X_{Feed,i}$=Volume fraction of each gas in the feed
$P_{Perm}$=Permeate gas pressure (kPa)
STP is standard temperature and pressure, which is defined here as 25.0° C. and 1 atmosphere (101.325 kPa).

Selectivity

Selectivity ($\alpha_{O2/N2}$) was calculated from $Q_{O2}$ and $Q_{N2}$ calculated above, based on following equation:

$$\alpha_{O2/N2} = Q_{O2}/Q_{N2}$$

EXAMPLE 1

Part (a)—Permeate Collection Tube

A tube of internal diameter 47 mm and external diameter 50 mm, made from stainless steel Grade 316, was cut to a length of 1 m. Holes of diameter 4 mm were drilled through the tube wall to give an aperture ratio of 15% (i.e. the holes occupied 15% of the surface area of the permeate collection tube).

Part (b)—Wound Membrane Structure (b1) Permeate Envelopes

A rectangular, gas-impermeable sheet made of PET (600 mm×600 mm) was sandwiched between two rectangular sheets of permeate carrier made of epoxy coated polyester (900 mm×900 mm). The gas impermeable sheet was positioned at the centre of the short edge of the permeate carrier sheets and fixed there using an adhesive to give a permeate envelope. This was repeated a further 20 times to give 21 permeate envelopes comprising permeate carrier-gas-impermeable sheet-permeate carrier.

(b2) Membrane Envelopes

A rectangular membrane sheet (900 mm×1,800 mm) was folded around a feed spacer sheet made of polypropylene (900 mm×900 mm). The feed spacer sheet was positioned at the centre of the short edge, inside the fold of the membrane sheets and fixed there using an adhesive to give a membrane envelope. This was repeated a further 21 times to give 22 membrane envelopes comprising membrane-feed spacer-membrane.

(b3) Wound Membrane Structure

The membrane fold of a membrane envelope prepared as described in (b2) above was glued onto the permeate collection tube. The long sides of the collection were then glued to the long side of adjacent membrane envelopes to form a gas-tight seal, optionally with the permeate envelope (prepared as described in (b1) above) between each pair of membrane envelopes. This process was repeated until all to 22 membrane envelopes and 21 permeate envelopes were adhered to the permeate collection tube in an alternate manner. The envelopes were then wound spirally onto the permeate collection tube to give a cylindrical, wound membrane structure comprising alternate membrane envelopes and permeate envelopes having two parallel, essentially circular end faces. Plastic bands were applied to the resultant wound membrane structure to prevent unwinding.

Part (c)—Fitting the ATD and Clamp

Figure 1B:
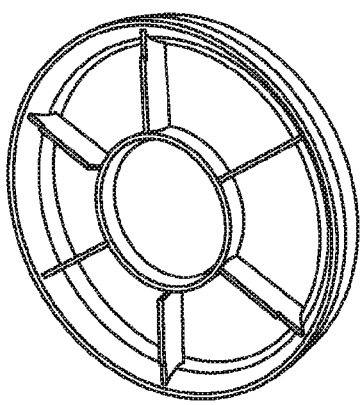

ATDs constructed as shown in FIGS. 1(a) and 1(b) were slid onto each end of the projecting tube and abutted firmly against the wound membrane structure, with the side shown in FIG. 1(b) contacting the end faces of the wound membrane structure. Two clamps constructed as shown in FIG. 5 (each being referred to as "Clamp Type A" for convenience) were then slid onto each end of the tube, pressed firmly against the relevant ATD and the clamp bolts were then tightened to ensure the ATDs remain in place.

The plastic bands were removed and the resultant construct was placed in a pipe having an inlet for feed gas and separate outlets for permeate and retenate gases.

The properties of the resultant module are shown in Table 1 below and the test results are shown in Table 2.

EXAMPLE 2

Example 1 was repeated except that in place of the ATD shown in FIG. 1(a) and FIG. 1(b) there was used an alternative ATD having the properties shown in Table 1 below.

The properties of the resultant module are shown in Table 1 below and the test results are shown in Table 2.

COMPARATIVE EXAMPLES 1 AND 2

Comparative Examples 1 and 2 (CEx1 and CEx2) were prepared exactly as described for Example 1 except that $L_{CP}$, $L_{contact}$ and $L_{VENT}$ were changed as shown in Table 1. The value of "R" for each ATD and the flap angles are also shown in Table 1.

The properties of the resultant module are shown in Table 1 below and the test results are shown in Table 2.

TABLE 1

| | ATD Properties | | | | |
|---|---|---|---|---|---|
| Example | $L_{CP}$ (mm²) | $L_{contact}$ (mm²) | $L_{VENT}$ (mm²) | R | Flap angle [°] |
| 1 | 30,000 | 210 | 18,800 | 1.58 | 87.1 |
| 2 | 29,800 | 420 | 19,100 | 1.54 | 87.1 |
| CEx1 | 27,400 | 960 | 18,800 | 1.41 | 90.0 |
| CEx2 | 29,000 | 1,080 | 14,400 | 1.93 | 68.2 |

Test Results

A feed gas (air comprising $N_2$ and $O_2$) was fed into the modules described in Table 1 above at a pressure of 6 bar. The gas flux and selectivity of the modules was measured using the methods described above and the results are shown in Table 2 below. In Table 2, the stated $O_2/N_2$ selectivity values are all relative to the $O_2/N_2$ selectivity of CEx1. For example, the $O_2/N_2$ selectivity of Example 1 was 1.070 times that of CEx1:

TABLE 2

| | Test Results | | | |
|---|---|---|---|---|
| Example | R | Flap angle [°] | $O_2/N_2$ selectivity ($\alpha O_2/N_2$) relative to CEx1 | Permeate flow |
| 1 | 1.58 | 87.1 | 1.070 | 1.040 |
| 2 | 1.54 | 87.1 | 1.092 | 1.063 |

TABLE 2-continued

Test Results

| Example | R | Flap angle [°] | $O_2/N_2$ selectivity ($\alpha O_2/N_2$) relative to CEx1 | Permeate flow |
|---|---|---|---|---|
| CEx1 | 1.41 | 90 | 1.000 | 1.000 |
| CEx2 | 1.93 | 68.2 | 1.026 | 0.923 |

EXAMPLES 3 AND 4

Effect of Varying the Clamp

Examples 3 and 4 were prepared by repeating Example 1, except that instead of using Clamp Type A shown in FIG. 5 at each end of the wound membrane structure, there was used Clamp Type B or Clamp Type C, wherein Clamp Types B and C have the properties shown in Table 3 below. For comparison purposes Table 3 also includes the results for Example 1 and CEx1 which used Clamp Type A at both ends of the wound membrane structure. In Table 3, the stated $O_2/N_2$ selectivity and permeate flow values are all relative to the corresponding values for CEx1:

TABLE 3

Effect of Varying the Clamp on Selectivity and Permeate Flow

| Example | R | Clamp Used at each end | Clamp Porosity (%) | $O_2/N_2$ selectivity ($\alpha O_2/N_2$) relative to CEx1 | Permeate flow relative to CEx1 |
|---|---|---|---|---|---|
| 1 | 1.58 | Clamp Type A (6 holes) | 13 | 1.070 | 1.040 |
| 3 | 1.54 | Clamp Type B (no holes) | 0 | 1.03 | 1.00 |
| 4 | 1.54 | Clamp Type C (10 holes) | 21 | 1.072 | 1.042 |
| CEx1 | 1.41 | Clamp Type A (6 holes) | 13 | 1.000 | 1.000 |

The invention claimed is:

1. A gas separation module comprising:
  (a) a permeate collection tube;
  (b) a membrane envelope wound spirally around the tube to provide a wound membrane structure comprising two end faces; and
  (c) an anti-telescoping device (ATD) secured to the permeate collection tube, the ATD comprising:
    (i) an inner peripheral part,
    (ii) an outer peripheral part which surrounds the inner peripheral part,
    (iii) one or more connection parts which connect the inner peripheral part and the outer peripheral part and which contacts with one of said end faces; and
    (iv) vents which allow gas to flow through the ATD;
  wherein the ATD satisfies Formula (1):

$$(L_{CP} - L_{contact})/(L_{VENT}) = R \quad \text{Formula (1)}$$

wherein:
  R is from 1.47 to 1.88;
  $L_{VENT}$ is the cross sectional area of the vents which allow gas to flow through the ATD;
  $L_{CP}$ is the total area inside the outer peripheral part; and
  $L_{contact}$ is the contact area of the connection parts and the end face of the wound membrane envelope.

2. The gas separation module according to claim 1 wherein at least one of the one or more connection parts has a face nearest to the wound membrane structure and a face furthest away from the wound membrane structure, wherein the face nearest to the wound membrane structure is narrower than the face furthest away from the wound membrane structure.

3. The gas separation module according to claim 1 wherein the one or more connection parts have a trapezoidal cross section wherein the narrowest end of the trapezoid is nearer to the wound membrane structure than the widest end of the trapezoid.

4. The gas separation module according to claim 3 wherein the one or more connection parts has an isosceles trapezoidal cross section having a base angle of 70 to 89°.

5. The gas separation module according to claim 1 which further comprises a clamp for securing the ATD in contact with an end face of the wound membrane structure.

6. The gas separation module according to claim 5 wherein the clamp comprises vents through which gas may flow.

7. The gas separation module according to claim 1 wherein the permeate collection tube and the wound membrane structure have a circular cross section.

8. The gas separation module according to claim 1 wherein the ATD has the profile of a spoked-wheel, when viewed in a plane perpendicular to the permeate collection tube.

9. The gas separation module according to claim 6 wherein the clamp comprises at least two parts, which parts are secured together around the permeate collection tube.

10. The gas separation module according to claim 1 wherein the wound membrane structure further comprises a permeate carrier.

11. The gas separation module according to claim 1 wherein the wound membrane structure further comprises a permeate envelope comprising at least two permeate spacers and a gas-impermeable sheet, wherein the gas-impermeable sheet is located between the at least two permeate spacers.

12. The gas separation module according to claim 1 wherein the membrane envelope comprises a feed spacer and one or more membranes, wherein the feed spacer is sandwiched between the one or more membranes.

13. The gas separation module according to claim 1 which comprises two of said ATDs, one at each end of the wound membrane structure and in contact with the respective end face, thereby preventing the wound membrane structure from unwinding from the tube.

14. The gas separation module according to claim 10 which further comprises two clamps for securing the ATDs in contact with the respective end faces, wherein the clamps comprise vents through which gas may flow.

15. A gas separation device comprising two or more modules according to claim 1.

16. A process for separation of a feed gas containing a target gas into a gas stream rich in the target gas and a gas stream depleted in the target gas comprising passing the feed gas through a module according to claim 1.

17. A process for separation of a feed gas containing a target gas into a gas stream rich in the target gas and a gas stream depleted in the target gas comprising passing the feed gas through a module according to claim 6.

* * * * *